US011898711B2

(12) United States Patent
Chami et al.

(10) Patent No.: US 11,898,711 B2
(45) Date of Patent: Feb. 13, 2024

(54) MODULAR LIGHTBAR SYSTEM AND METHOD

(71) Applicant: MAXLITE, INC., Caldwell, NJ (US)

(72) Inventors: Aymen Chami, Hackettstown, NJ (US); Yaolin Tang, Ningbo (CN)

(73) Assignee: MAXLITE, INC, Pine Brook, NJ (US)

( * ) Notice: Subject to any disclaimer, the term of this patent is extended or adjusted under 35 U.S.C. 154(b) by 0 days.

(21) Appl. No.: 18/157,526

(22) Filed: Jan. 20, 2023

(65) Prior Publication Data

US 2023/0151933 A1 May 18, 2023

Related U.S. Application Data

(60) Continuation of application No. 17/724,542, filed on Apr. 20, 2022, now Pat. No. 11,598,496, which is a continuation of application No. 17/161,872, filed on Jan. 29, 2021, now Pat. No. 11,313,522, which is a continuation of application No. 16/893,848, filed on Jun. 5, 2020, now Pat. No. 10,914,435, which is a division of application No. 15/945,843, filed on Apr. 5, 2018, now Pat. No. 10,683,973.

(60) Provisional application No. 62/489,586, filed on Apr. 25, 2017.

(51) Int. Cl.

| | |
|---|---|
| ***F21S 2/00*** | (2016.01) |
| ***F21V 5/04*** | (2006.01) |
| ***F21V 23/06*** | (2006.01) |
| ***F21V 23/04*** | (2006.01) |
| *F21V 21/30* | (2006.01) |
| *F21Y 103/10* | (2016.01) |
| *F21Y 115/10* | (2016.01) |
| *F21V 23/00* | (2015.01) |

(52) U.S. Cl.

CPC ................ *F21S 2/005* (2013.01); *F21V 5/04* (2013.01); *F21V 23/04* (2013.01); *F21V 23/06* (2013.01); *F21V 21/30* (2013.01); *F21V 23/002* (2013.01); *F21V 23/0442* (2013.01); *F21Y 2103/10* (2016.08); *F21Y 2115/10* (2016.08)

(58) Field of Classification Search

CPC . F21V 23/04; F21V 23/06; F21V 5/04; F21V 23/002; F21V 23/0442; F21V 21/30; F21Y 2103/10; F21Y 2115/10; F21S 2/005

See application file for complete search history.

(56) References Cited

U.S. PATENT DOCUMENTS

| | | | |
|---|---|---|---|
| 5,301,090 | A | 4/1994 | Hed |
| 7,854,531 | B1 | 12/2010 | Lyons |
| 8,585,244 | B1 | 12/2013 | Liu et al. |

(Continued)

*Primary Examiner* — Kevin Quarterman

(74) *Attorney, Agent, or Firm* — Budzyn IP Law, LLC

(57) ABSTRACT

A lightbar assembly connector for use in a modular lightbar system to connect two or more lightbar assemblies together and having a design and configuration that enables the lightbar assembly connector and lightbar assemblies to be connected by moving the lightbar assembly connector in a direction generally transverse to the longitudinal axis of the lightbar assembly (or by moving the lightbar assembly in a direction generally transverse to the major surface of the lightbar assembly connector). It is thus possible to assemble a modular lightbar system comprised of a plurality of lightbar assemblies and lightbar assembly connectors, any of which are easily removable, replaceable, or serviceable without having to remove or move lightbar assemblies that do not need to be replaced or serviced.

23 Claims, 12 Drawing Sheets

(56) References Cited

U.S. PATENT DOCUMENTS

| | | | |
|---|---|---|---|
| 9,239,136 | B1 | 1/2016 | Petersen et al. |
| 2004/0246714 | A1 | 12/2004 | Talamo et al. |
| 2006/0221609 | A1 | 10/2006 | Ryan |
| 2008/0298058 | A1 | 12/2008 | Kan et al. |
| 2010/0008090 | A1 | 1/2010 | Li et al. |
| 2013/0016500 | A1 | 10/2013 | Tress |

MODULAR LIGHTBAR SYSTEM AND METHOD

CROSS-REFERENCE TO RELATED APPLICATIONS

This application is a continuation of U.S. patent application Ser. No. 17/724,542, filed Apr. 20, 2022, now pending, which is a continuation of U.S. patent application Ser. No. 17/161,872, filed Jan. 29, 2021, now U.S. Pat. No. 11,313, 522, which is a continuation of U.S. patent application Ser. No. 16/893,848, filed Jun. 5, 2020, now U.S. Pat. No. 10,914,435, which is a division of U.S. patent application Ser. No. 15/945,843, filed Apr. 5, 2018, now U.S. Pat. No. 10,683,973, which claims priority to U.S. Provisional Patent Application No. 62/489,586 filed Apr. 25, 2017, the contents of which are incorporated by reference herein.

FIELD OF THE INVENTION

The present invention relates to improvements to modular lightbar systems.

BACKGROUND OF THE INVENTION

Lightbar systems continue to increase in popularity and utility as they become easier to use and install, and cheaper to manufacture and operate. Using solid state lights (SSL) as the light source provides increased reliability and usable life, as well as simplicity of installation and service. Lightbar systems with an SSL light source are virtually trouble-free, and last well beyond the expected life of incandescent or fluorescent light sources.

Lightbar systems typically comprise one or more lightbar assemblies connected in a desired layout, e.g., under-cabinet lighting in a kitchen, display cases, cove lighting, track lighting, and wall wash lighting applications. The lightbar assemblies are elongate rectangularly shaped, and connected, end-to-end, using a joiner that electrically connects one lightbar assembly to another. Once the lightbar assemblies are connected to form a lightbar system, a single lightbar assembly cannot be removed without removing the adjacent lightbar assemblies to which it is connected. This presents significant problems for removing a lightbar assembly that is not located at an end of the lightbar system. It may be the case that the entire lightbar system must be disassembled to service or replace a single lightbar assembly.

Thus, there exists a need for a solution to the above-identified shortcomings of the prior art.

SUMMARY OF THE INVENTION

The present invention is directed to a modular light system that overcomes the above-described shortcomings in the art. Specifically, in accordance with an embodiment of the present invention, and as an object of the present invention, a modular lightbar system is provided that is more flexibly configurable, enabling easy installation, configuration and service.

Such a design and configuration enables the lightbar assembly connector and lightbar assembly to be connected by moving the lightbar assembly connector in a direction generally transverse to the longitudinal axis of the lightbar assembly (or by moving the lightbar assembly in a direction generally transverse to the major surface of the lightbar assembly connector). It is thus possible, in accordance with embodiments of the present invention, to assemble a lightbar system comprised of a plurality of lightbar assemblies and lightbar assembly connectors, any of which are removable, replaceable, serviceable, etc., without having to disassemble the entire lightbar system. Any one component (e.g., lightbar assembly, lightbar assembly connector, etc.) may be removed and replaced simply, easily and safely.

DESCRIPTION OF THE DIAGRAMS

Embodiments of the present invention will now be described with reference to the following diagrams, wherein.

DESCRIPTION OF EMBODIMENTS OF THE INVENTION

Figure 1:
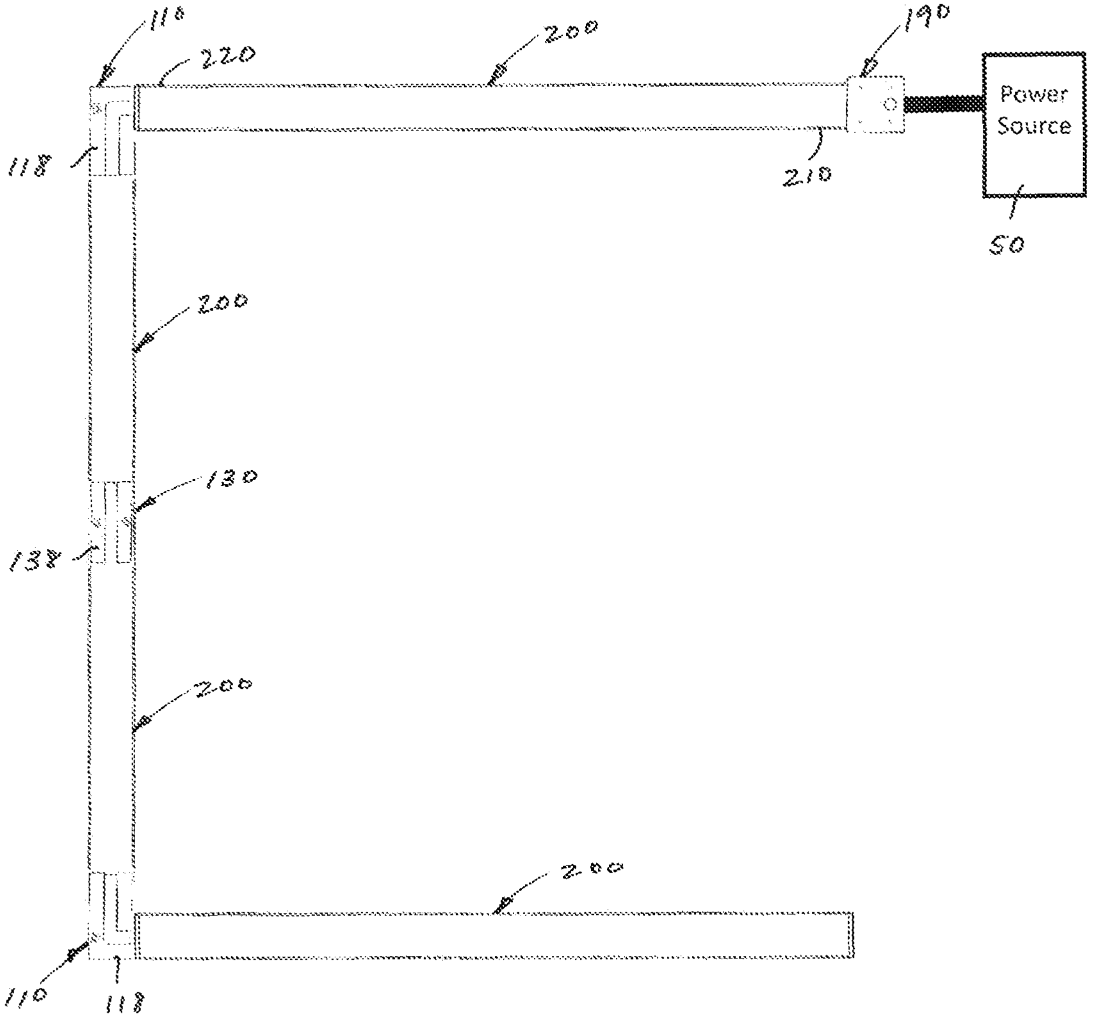
FIG. 1 depicts a lightbar system in accordance with an embodiment of the present invention.
Figure 2:
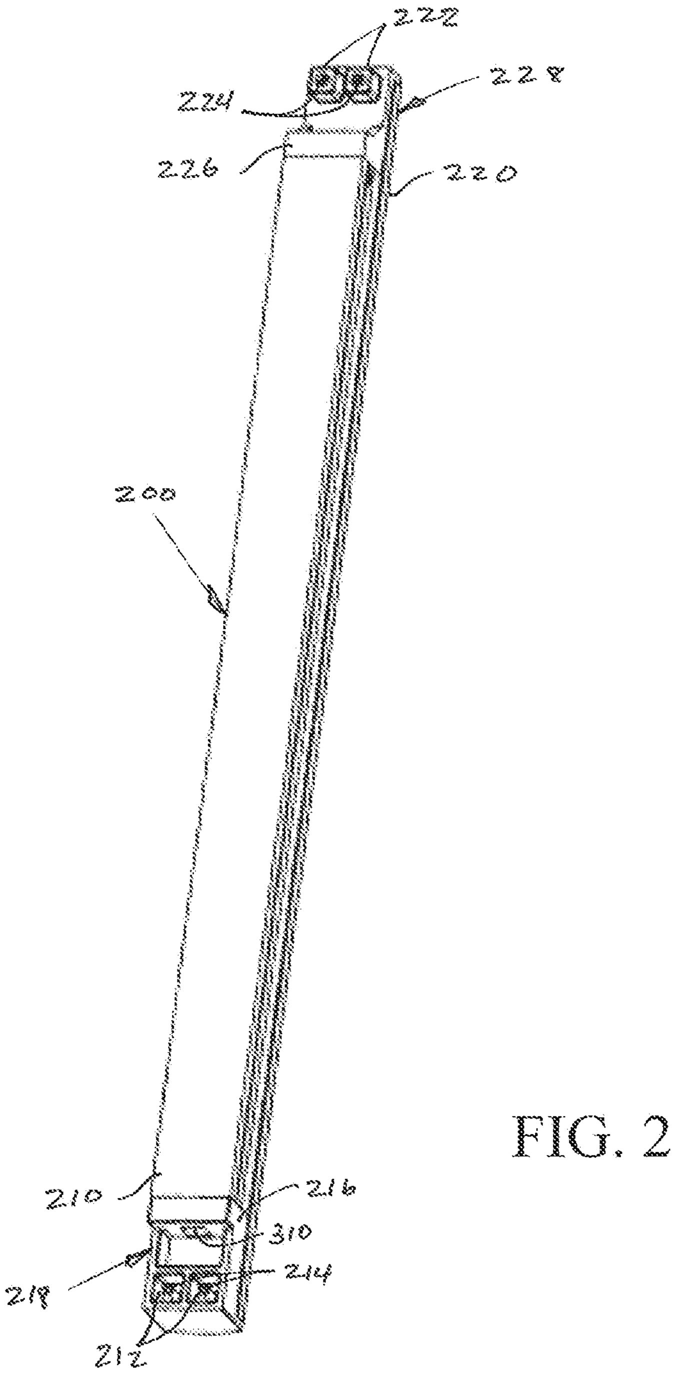
FIG. 2 is a perspective view of a lightbar assembly in accordance with an embodiment of the present invention.

The present invention will now be described in detail and with reference to the drawing figures. Referring first to FIGS. 1-7, a lightbar system 100 in accordance with an embodiment of the present invention comprises a lightbar assembly 200 and at least a lightbar assembly connector 110, 130, 150, 170 or 190. The lightbar assembly connector may be a straight connector 130, and angle connector 110, a joiner assembly 150, a distribution box 170 or a power connector box 190. Each of these will be described in more detail below. The embodiment of FIG. 1 depicts a plurality of lightbar assemblies 200 connected by a plurality of lightbar assembly connectors 110, 130 to form a "S", "Z", "C", or "U" shaped configuration. This depiction is exemplary only, and the present invention is flexibly and selectively configurable in countless configurations. Each lightbar assembly 200 has a receptacle end 210 and a plug end 220 that are located at longitudinally separated ends of the lightbar assembly 200. The receptacle end 210 has a receptacle end cap 216 that is configured as a receptacle connector 218 having two receptacles 212, each with a conductive external terminal 214. The external terminals 214 are not accessible beyond the confines of the space defined by the receptacle 212, thus providing a safe connector that prevents unintended or accidental contact with these terminals 214. The plug end 220 has a plug end cap 226 that is configured as a plug connector 228 having two plugs 222, each with a conductive internal terminal 224. Each of the external terminals 214 and internal terminals 224 extend in a direction transverse to a longitudinal axis of the lightbar assembly 200.

Figure 3:
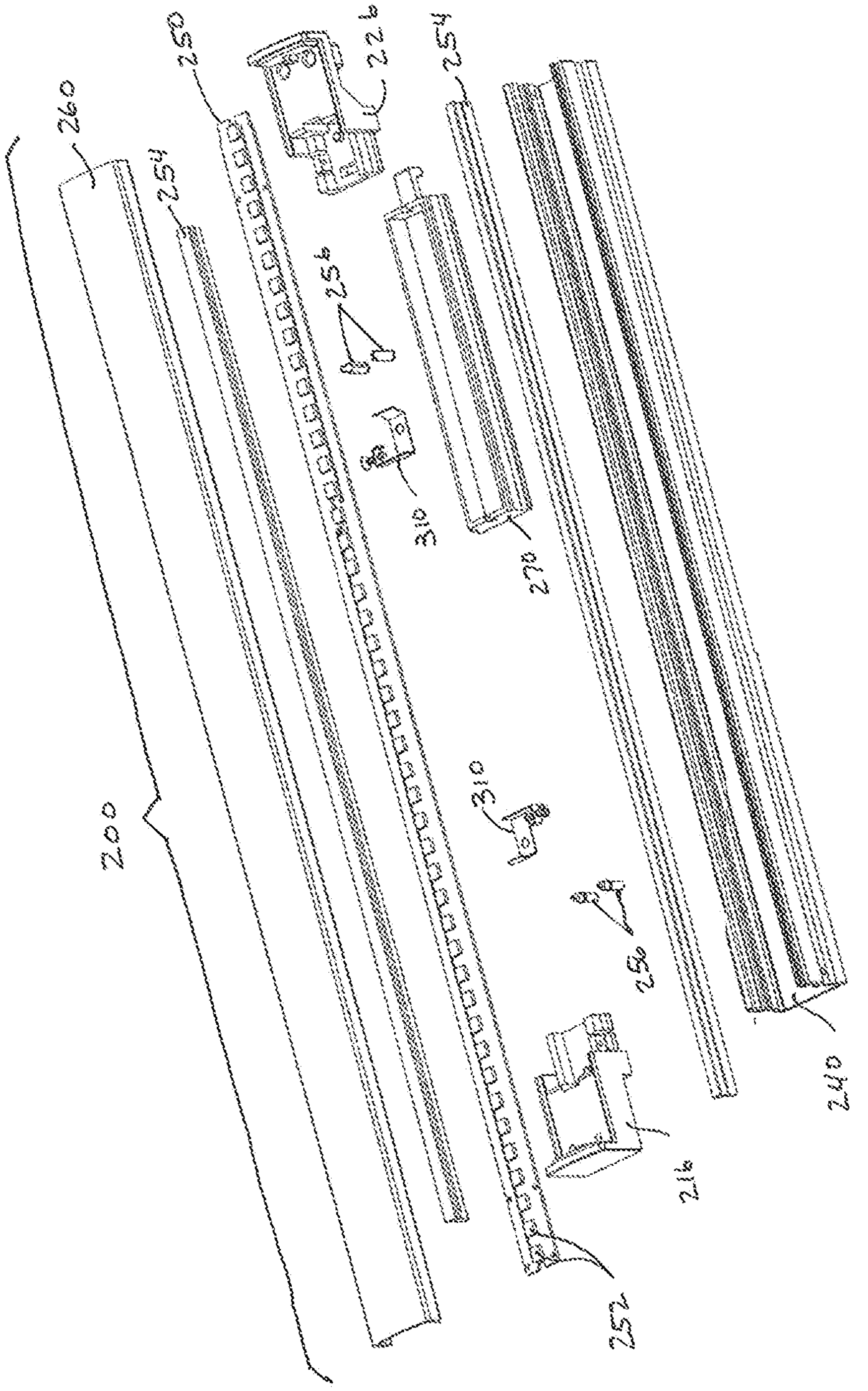
FIG. 3 is an exploded view of a lightbar assembly in accordance with an embodiment of the present invention.

As depicted in FIG. 3, a lightbar assembly 200 in accordance with embodiments of the present invention comprises a housing 240 that may be constructed of extruded aluminum, for example, and that is generally elongate with a square, rectangular, oval, elliptical, or other geometric cross section. A SSL strip 250 light source has a plurality of LEDs 252 electrically connected. Conductive pins 256 connect one end of the SSL strip 250 to the external terminals 214 of the receptacle end cap 216, and the other end of the SSL strip 250 to the internal terminals 224 of the plug end cap 226. Ground terminals 310 are mechanically secured to receptacle end cap 216 and plug end cap 226 and to support 254 to provide a ground connection for the SSL strip 250 and for the lightbar assembly 200. The SSL strip 250 is supported by at least one support 254, preferably two supports 254, that maintain the SSL strip 250 in a desired position within the housing 240. The supports 254 may be positioned in thermal contact with the SSL strip 250, acting as a heat sink. If at least one support 254 is in contact with the housing 240, the housing 240 will also function as a heat sink to the SSL strip 250. A lens 260 connects with the housing 240 to enclose the SSL strip 250 within the lightbar assembly 200. The lens 260 may provide diffusion for the light emitted by the LEDs 252. Driver circuitry (not shown) for the SSL strip 250 may be at least partially contained in a driver enclosure 270. Other components may also be provided in the lightbar assembly 200, including, by way of non-limiting example, motion sensors to control aspects of the lightbar assembly such as on/off, brightness, etc., Bluetooth® connectivity, brightness controls, color control, and other components suitable for controlling one or more LEDs.

Figure 4:
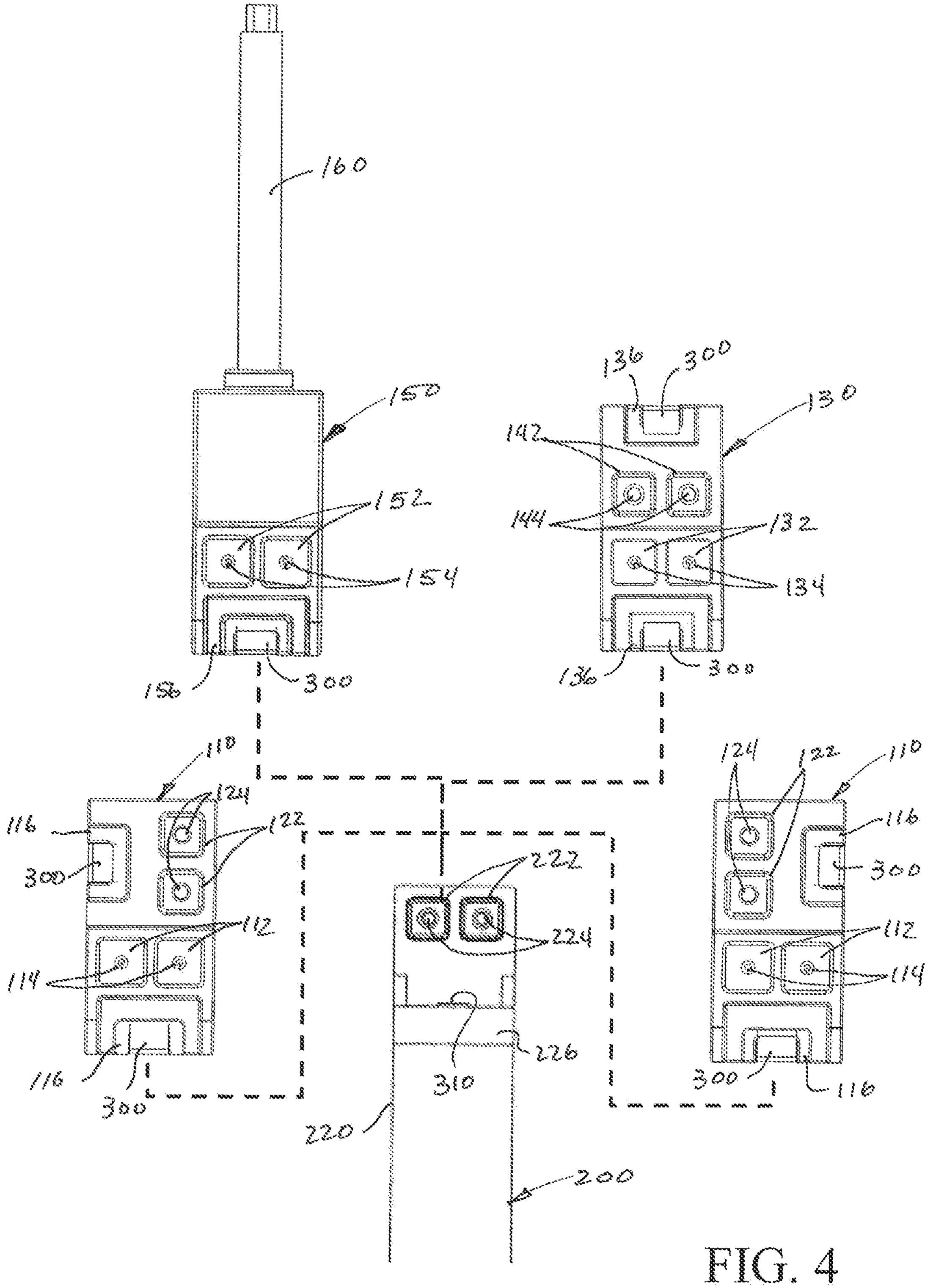
FIG. 4 depicts a plug end of a lightbar assembly and a variety of lightbar assembly connectors in accordance with an embodiment of the present invention.
Figure 5:
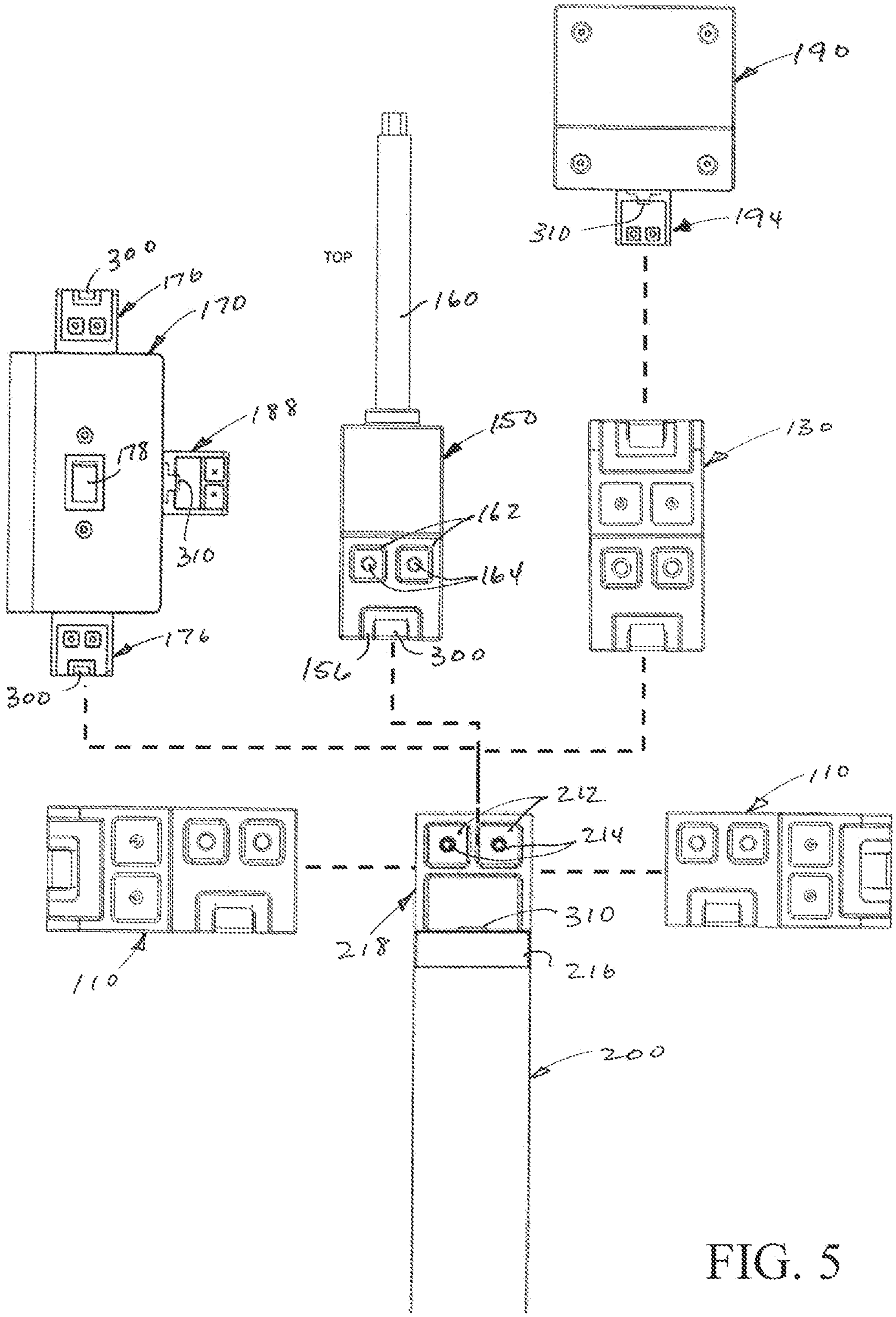
FIG. 5 depicts a receptacle end of a lightbar assembly and a variety of lightbar assembly connectors in accordance with an embodiment of the present invention.

The modular lightbar system 100 of the present invention also comprises at least one of a straight connector 130, and angle connector 110, a joiner assembly 150, a distribution box 170 or a connection box 190, as depicted in FIGS. 4 and 5. Any one of the lightbar assembly connectors depicted may be connected with the lightbar assembly 200, as described in more detail herein. Referring first to FIG. 4, the plug end 220 of a lightbar assembly 200 is depicted with two angle connectors 110, a straight connector 130 and a joiner assembly 150—only one of which may be releasably connected to a plug end 220 of the lightbar assembly 200 at one time. The plug connector 228 has two plugs 222, each having a conductive internal terminal 224. The plugs 222 and terminals 224 are sized and shaped to respectively engage with and contact a receptacle and terminal of any of an angle connector 110, a straight connector 130 and a joiner assembly 150.

Referring next to FIG. 5, the receptacle end 210 of a lightbar assembly 200 is depicted with two angle connectors 110, a straight connector 130, a joiner assembly 150, a distribution box 170, and a power connector box 190—only one of which may be releasably connected to a receptacle connector 218 of the lightbar assembly 200 at one time. The receptacle connector 218 has two receptacles 212, each having a conductive external terminal 214. The receptacles 212 and terminals 214 are sized and shaped to respectively engage with and contact a plug and terminal of any of an angle connector 110, a straight connector 130, a joiner assembly 150, a distribution box 170 and a power connector box 190.

Figure 8A:
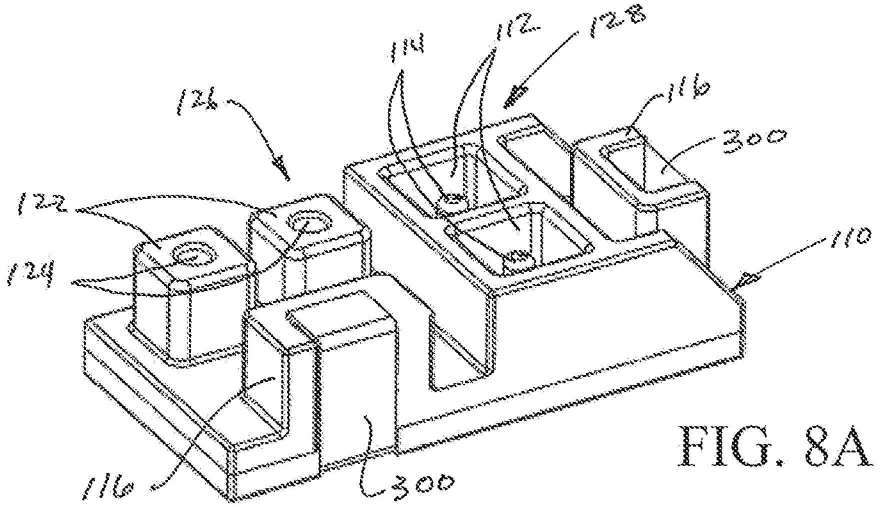
FIGS. 8A and 8B are perspective views of two embodiments of an angle lightbar assembly connector in accordance with embodiments of the present invention.
Figure 8B:
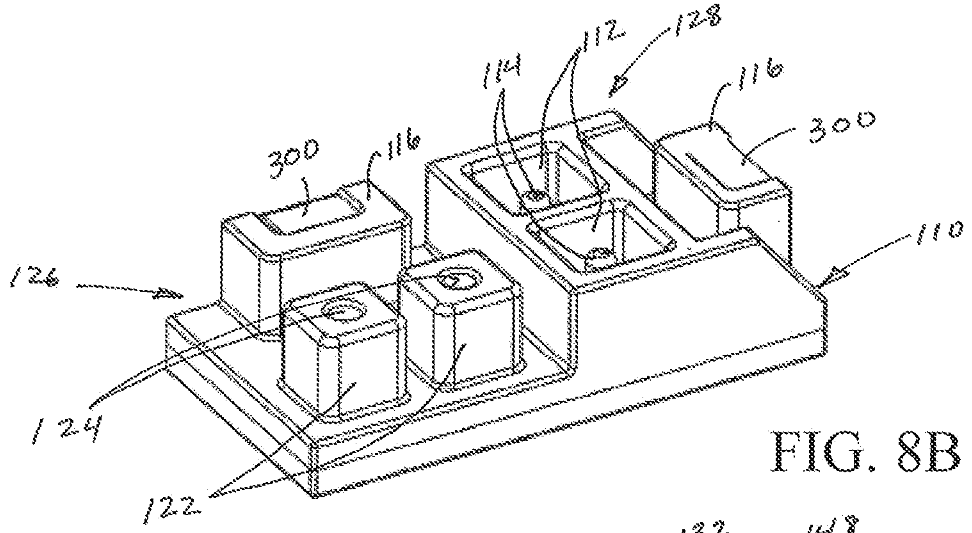

Referring next to FIGS. 8A and 8B, an angle connector 110 in accordance with embodiments of the present invention will now be descried in more detail. An angle connector 110 enables connection of two lightbar assemblies 200 at a predefined angle with respect to each other. Preferably, the predefined angle is 90 degrees, but other fixed or selectable angles are contemplated by and within the scope and spirit of the present invention. The embodiments of FIGS. 8A and 8B differ mainly in the orientation of the angle with respect to a longitudinal center line of each lightbar assembly 200. The orientation of the angle of these embodiments differs by 180 degrees when the predetermined angle of the angle connector 110 is 90 degrees. In use, a first lightbar assembly 200 will be installed so that is longitudinal center line is in a desired orientation. A second lightbar assembly 200 may be connected to the first lightbar assembly 200 using an angle connector 110 so that the longitudinal center line of the second lightbar assembly 200 will be at a 90-degree orientation with respect to the longitudinal center line of the first lightbar assembly 200. Whether the second lightbar assembly 200 extends to the right or left of the first lightbar assembly 200 depends upon which angle connector 110 is used.

Figure 7:
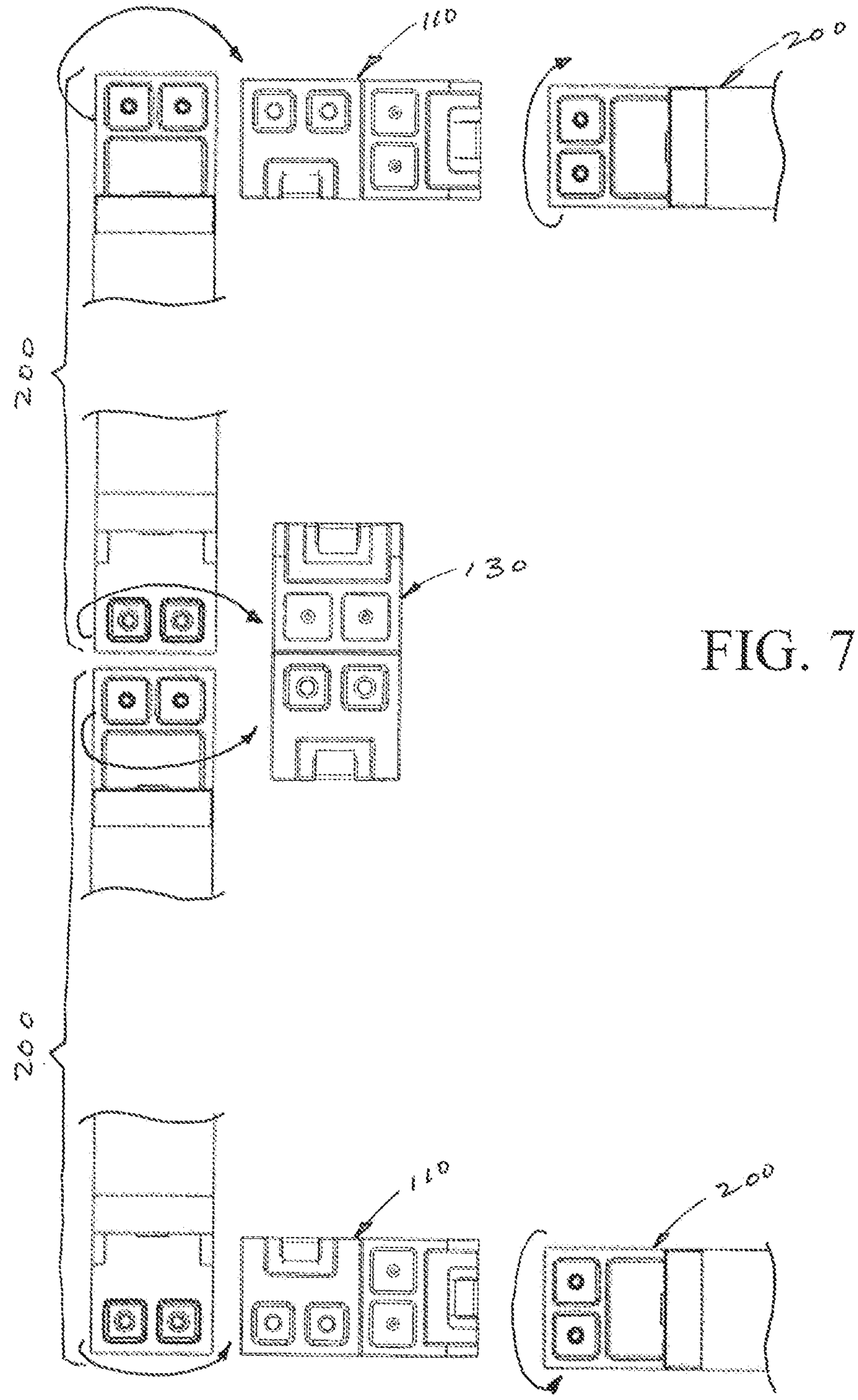
FIG. 7 depicts a plurality of lightbar assemblies and lightbar assembly connectors in accordance with an embodiment of the present invention.

The angle connector 110 has a receptacle connector 128 and a plug connector 126. The receptacle connector 128 has two receptacles 112, each having a conductive external terminal 114 therein. The receptacles 112 and external terminals 114 are sized and shaped to respectively receive and contactingly engage a plug 222 and conductive internal terminal 224 of a lightbar assembly 200. The plug connector 126 has two plugs 122, each having a conductive internal terminal 124. The plugs 122 and internal terminals 124 are sized and shaped to respectively insert into and contactingly engage a receptacle 212 and conductive external terminal 214 of a lightbar assembly 200. The internal terminals 124 and external terminals 114 each extend in a direction transverse to a major surface 118 (see, e.g., FIG. 1) of the angle connector 110. A post 116 is provided near each of the two receptacles 112 and the two plugs 122 to releasably engage a complementarily sized and shaped part of a lightbar assembly 200. The post 116 has a ground terminal 300 that conductively connects with a ground terminal 310 (see, e.g., FIG. 3) on the complementarily sized and shaped part of the lightbar assembly 200 to which the angle connector 110 is connected. This ensures that the lightbar assembly 200 is fully grounded. The post 116 and part of the lightbar assembly 200 releasably secure the angle connector 110 and lightbar assembly 200 together. An exemplary and illustrative non-limiting connection of an angle connector 110 with a lightbar assembly 200 is depicted in FIGS. 1 and 7.

Figure 8C:
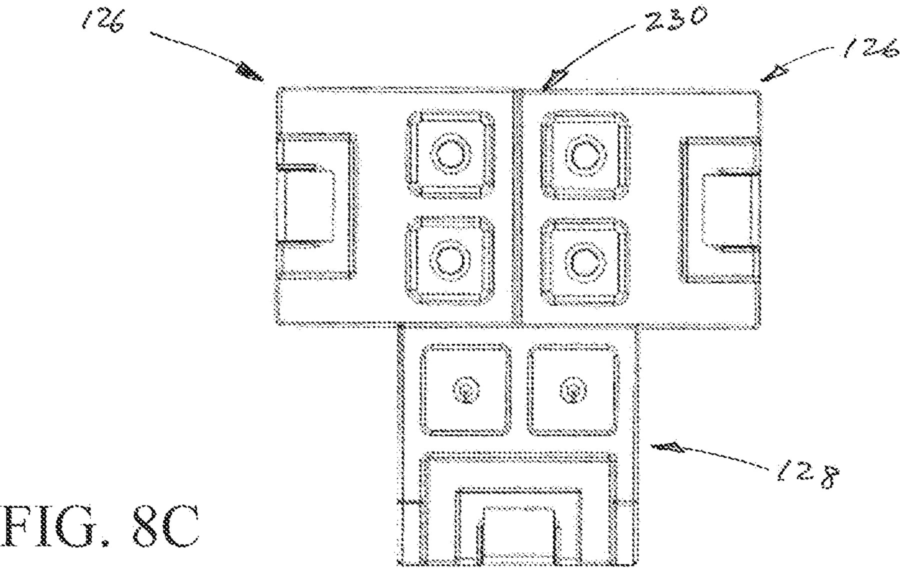
FIGS. 8C and 8D depict, respectively, a T-connector lightbar assembly connector, and a variable angle lightbar assembly connector in accordance with embodiments of the present invention.
Figure 8D:
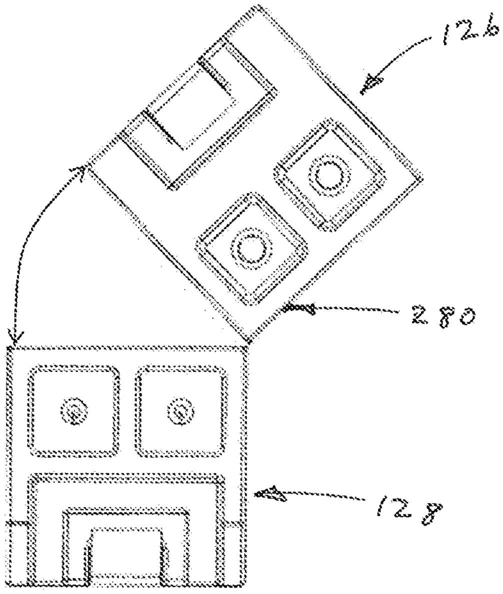

Referring next to FIGS. 8C and 8D, alternative embodiments of connectors in accordance with the present invention are depicted and will now be discussed. FIG. 8C depicts a T-connector 230 having two plug connectors 126 aligned with each other, and a receptacle connector 128 arranged perpendicular to the plug connectors 126. Alternative configurations are contemplated by, and within the scope and spirit of the present invention. FIG. 8D depicts a variable angle connector 280 having a plug connector 126 and a receptacle connector 128 that are arrangeable with respect to each other at any angle from 90° to 0°. Hinging may be by a living hinge, or other known or hereafter developed hinge of any type or construction. Electrical connection between the conductive components of the variable angle connector 280 is maintained throughout movement of the plug connector 126 and receptacle connector 128 with respect to each other by circuitry, circuit boards, conductive paths, cables, wires, or any known or hereafter developed conductive part, material or means.

Figure 9:
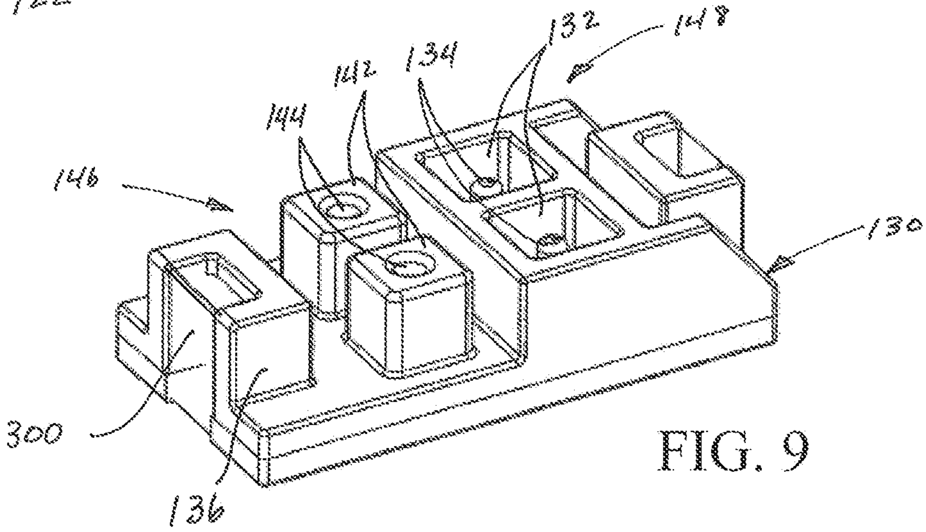
FIG. 9 is a perspective view of a straight lightbar assembly connector in accordance with an embodiment of the present invention.

A straight connector 130 depicted in FIG. 9 enables connection of two lightbar assemblies 200 at a predefined angle with respect to a longitudinal center line of the lightbar assemblies 200. The preferred predefined angle is 0 degrees, but other angles are contemplated by and within the scope and spirit of the present invention. The straight connector 130 has a plug connector 146 and a receptacle connector 148. The receptacle connector 148 has two receptacles 132, each having a conductive external terminal 134 therein. The receptacles 132 and external terminals 134 are sized and shaped to respectively receive and contactingly engage a plug 222 and conductive internal terminal 224 of a lightbar assembly 200. The plug connector 146 has two plugs 142, each having a conductive internal terminal 144. The plugs 142 and internal terminals 144 are sized and shaped to respectively insert into and contactingly engage a receptacle 212 and conductive external terminal 214 of a lightbar assembly 200. The internal terminals 144 and external terminals 134 each extend in a direction transverse to a major surface 138 (see, e.g., FIG. 1) of the straight connector 130. A post 136 is provided near each of the two receptacles 132 and the two plugs 142 to releasably engage a part of a lightbar assembly 200. The post 136 has a ground terminal 300 that conductively connects with a ground terminal 310 (see, e.g., FIG. 3) on the complementarily sized and shaped part of the lightbar assembly 200 to which the straight connector 130 is connected. This ensures that the lightbar assembly 200 is fully grounded. The post 136 and part of the lightbar assembly 200 releasably secure the straight connector 130 and lightbar assembly 200 together. An exemplary and illustrative non-limiting connection of a straight connector 130 with a lightbar assembly 200 is depicted in FIGS. 1, 6 and 7.

Figure 6:
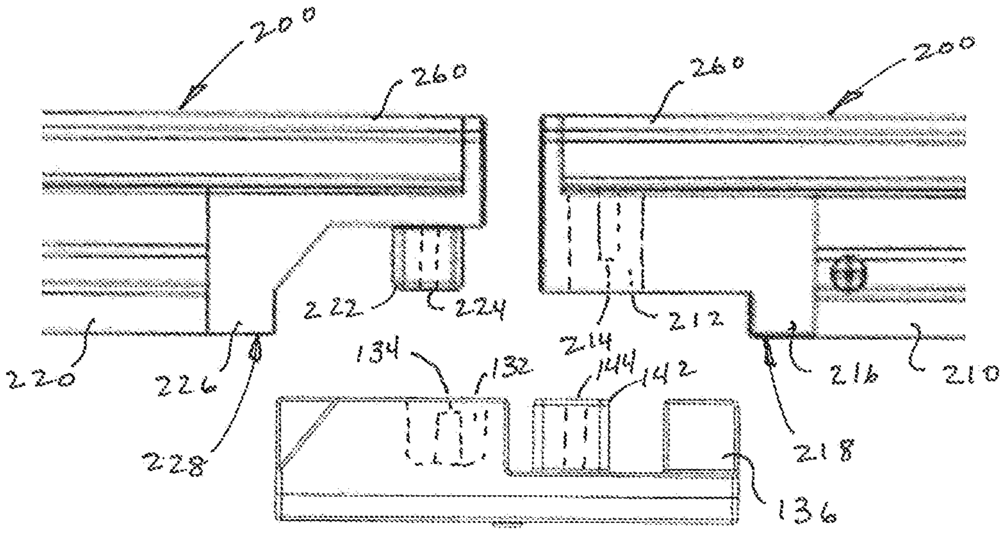
FIG. 6 depicts a plug end and a receptacle end of two lightbar assemblies, and a straight lightbar assembly connector in accordance with an embodiment of the present invention.

An exemplary connection between and among two lightbar assemblies 200 and a straight connector 130 is depicted in FIG. 6. The plug end 220 of a first lightbar assembly 200 is positioned proximate the receptacle end 210 of a second lightbar assembly 200. A straight connector 130 is positioned so its receptacles 132 are aligned with the plugs 222 of the plug connector 228 of the first lightbar assembly 200, and so its plugs 142 are aligned with the receptacles 212 of the receptacle connector 218 of the second lightbar assembly 200. The straight connector 130 is moved in a direction generally transverse to the longitudinal axes of the lightbar assemblies 200 so the plugs 222 of the first lightbar assembly 200 are received in the receptacles 132 of the straight connector 130, and the internal terminals 224 of the plugs 222 contact the external terminals 134 of the receptacles 132 to establish an electrical connection therebetween. Similarly, the plugs 142 of the straight connector 130 are received in the receptacles 212 of the second lightbar assembly 200, the external terminals 214 of the second lightbar assembly contacting the internal terminals 144 of the straight connector 130 to establish an electrical connection therebetween. The posts 136 and ground terminals 300 on the straight connector 130 releasably engage a complementarily sized and shaped part defined in each of the plug end cap 226 and receptacle end cap 216, and the ground terminals 310 is each of the plug end cap 226 and receptacle end cap 216. In similar fashion, the plurality of lightbar assembly connectors depicted in FIG. 7 are releasably connectable with the plurality of lightbar assemblies 200. The various lightbar assembly connectors depicted in FIG. 7 would be rotated as indicated when connecting them to the lightbar assemblies 200. The present invention thus provides a simple, convenient, safe and reliable lightbar system 100 where components may be connected and disconnected to add, replace, service or reconfigure the lightbar system 100 without having to unnecessarily remove components. This is accomplished by orienting the various conductive terminals generally transverse to a longitudinal axis of a lightbar assembly and to a major surface of the lightbar assembly connectors, resulting in the ability to connect and disconnect various components simply and easily.

Figure 10A:
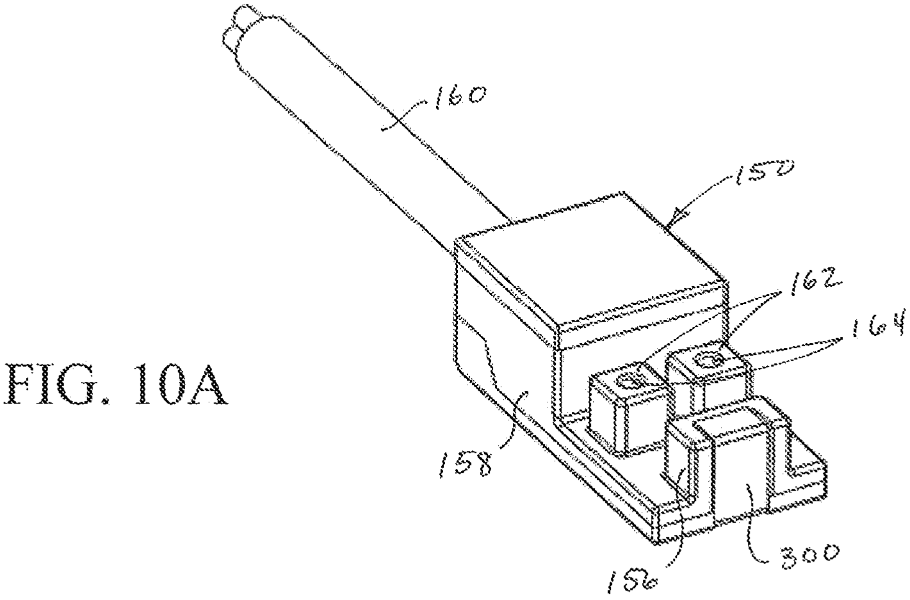
FIGS. 10A and 10B are perspective views of two embodiments of a joiner assembly in accordance with embodiments of the present invention.
Figure 10B:
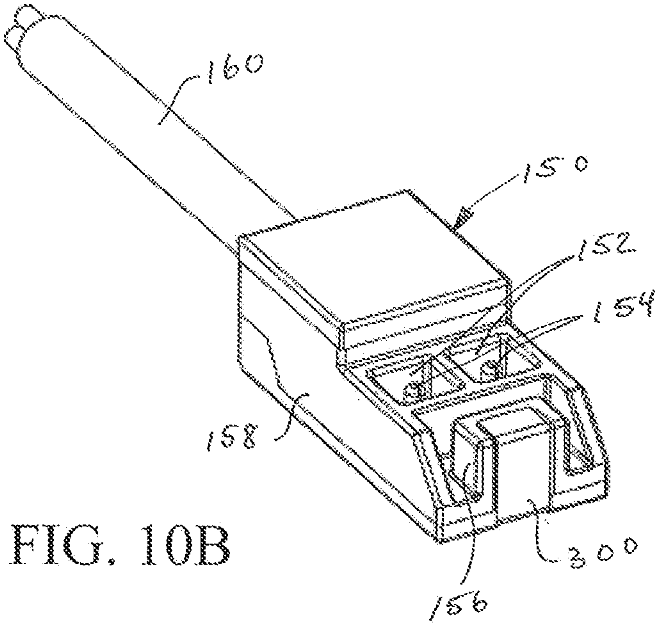

A joiner assembly 150, depicted in FIGS. 10A and 10B, may be connected to a lightbar assembly 200 to route power around an object. For example, it may be desirable to power two lightbar assemblies 200 from the same power source 50, but it is not possible to directly connect the two lightbar assemblies 200 due to an obstruction located between them. A first joiner assembly 150 may be connected to a first lightbar assembly 200, and a second joiner assembly 150 may be connected to a second lightbar assembly 200. A cable 160 may be connected between the two joiner assemblies 150 and routed around the obstruction to provide a path for power between the lightbar assemblies 200 despite the presence of an obstacle. The embodiment of FIG. 10A has a modular connector 158 with two plugs 162, each having a conductive internal terminal 164, and the embodiment of FIG. 10B has a modular connector 158 with two receptacles 152, each having a conductive external terminal 154. Both embodiments also have a post 156 to releasably engage a complementarily sized and shaped part of a lightbar assembly 200. The post 156 has a ground terminal 300 that conductively connects with a ground terminal 310 on the complementarily sized and shaped part of the lightbar assembly 200 to which the joiner assembly 150 is connected.

Figure 11:
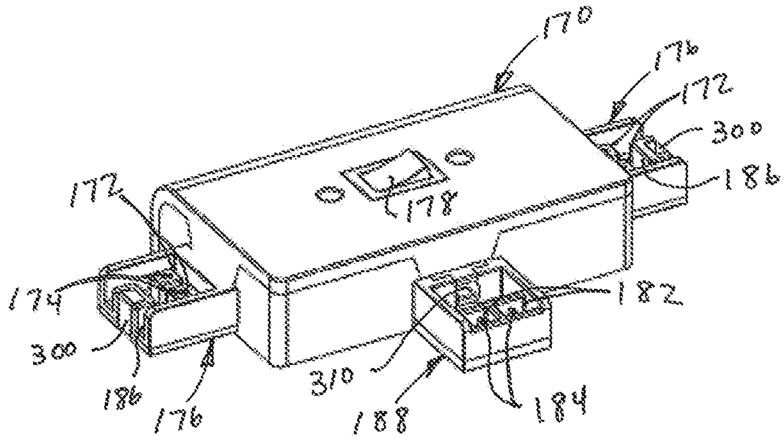
FIG. 11 is a perspective view of a distribution box in accordance with an embodiment of the present invention.

A distribution box 170, depicted in FIG. 11, may be connected to at least one lightbar assembly 200. The embodiment depicted in FIG. 11 has two plug connectors 176 and one receptacle connector 188. Alternatively, the distribution box 170 may have two receptacle connectors 188 and one plug connector 176. Each of the plug connectors 176 has two plugs 172, each having a conductive internal terminal 174. The receptacle connector 188 has two receptacles 182, each having a conductive external terminal 184. A switch 178 controls power to the transversely aligned connector, and to the components connected thereto. For the embodiment of FIG. 11, the switch 172 controls power to the receptacle connector 188.

Figure 12:
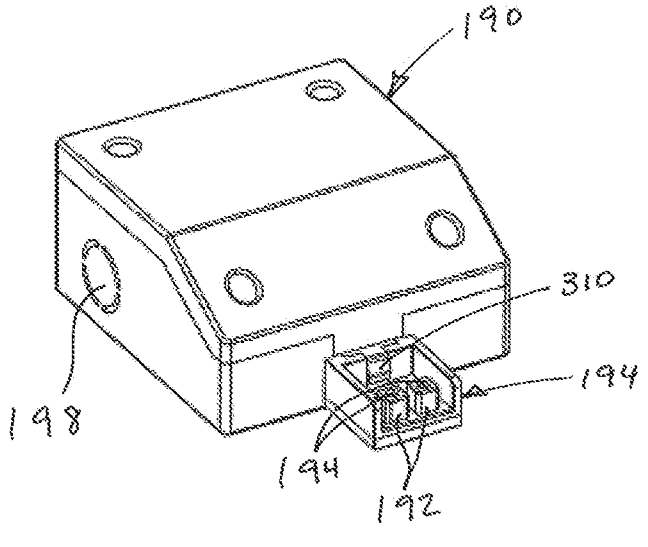
FIG. 12 is a perspective view of a power connection box in accordance with an embodiment of the present invention.

A power connector box 190, depicted in FIG. 12, provides connection between the power source 50 and a lightbar assembly 200. Connection to the power source 50 is made using a power cable (not shown) routed to an interior of the power connector box 190 through an opening 198 to terminals (not shown) in the interior of the power connection box 190. The interior terminals are conductively connected to conductive internal terminals 196 provided in plugs 192 of a plug connector 194. Connection of the plug connector 194 to a receptacle connector 218 of a lightbar assembly 200 provides a path to the lightbar assembly 200 from the power source. Alternatively, the power connector box may have a receptacle connector that is connectable to a plug connector 228 of a lightbar assembly 200.

Figure 13C:
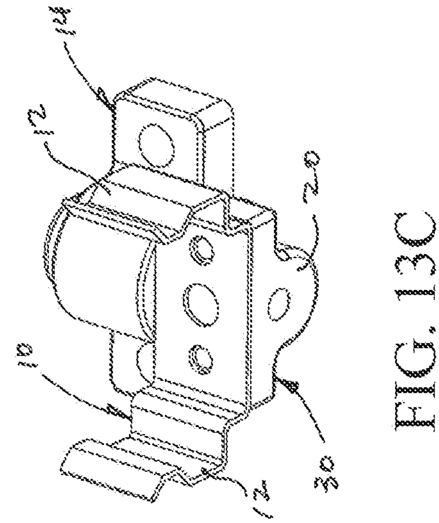
FIGS. 13A-13D are views of three embodiments of a mounting bracket in accordance with embodiments of the present invention.
Figure 13B:
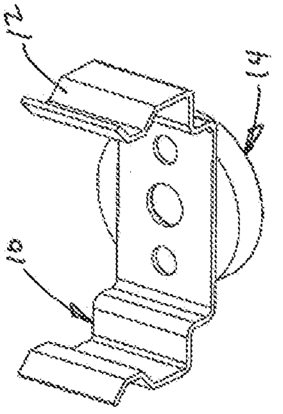
Figure 13A:
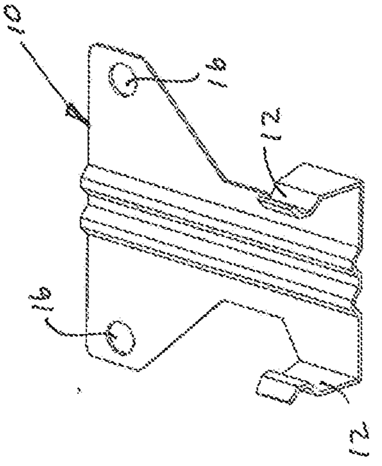
Figure 13D:
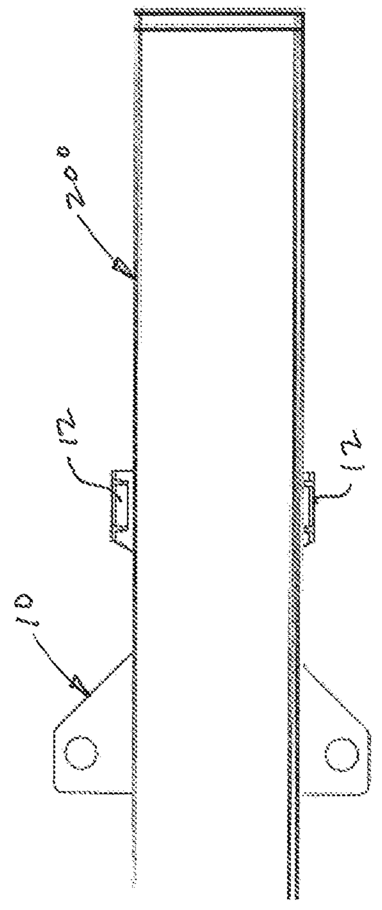

Individual lightbar assemblies 200 and the lightbar system 100 of the present invention are mountable to a surface using one or more mounting brackets, such as depicted in FIGS. 13A-13C. The mounting bracket 10 of FIG. 13A comprises two clips 12 that are sized and shaped to self-guide a lightbar assembly 200 into the bracket 10, and that are self-biased to hold the lightbar assembly 200 in place. Two mounting holes 16 are provided for screws or other similar mounting means to secure the mounting bracket 10 to a surface such as, for example, the underside of a kitchen cabinet. The mounting holes 16 are located outside the footprint of a lightbar assembly 200 when it is held in place in the mounting bracket 10 by the clips 12, as depicted in FIG. 13D. The mounting bracket 10 may alternatively have a base 14 that adheres to a surface without the need for additional fasteners or mounting means. The embodiment depicted in FIG. 13B includes a magnet (not shown) in the base 14 to secure the mounting bracket 10 to a magnetic surface. Alternatively, double-sided tape, Velcro®, or other known or hereafter developed self-fastening or self-securing means may be provided to secure the base 14 of this embodiment to a surface. In another alternative embodiment depicted in FIG. 13C, the mounting bracket 10 comprises a pivotable mounting bracket 30 connected to the base 14 with a coupling 20 that may provide pivoting or rotating movement of the lightbar assembly 200 mounted to the surface using this mounting bracket 10. This enables selective positioning of the lightbar assembly 200 to control the direction of light distribution. Mounting holes 16 for this embodiment are also provided outside the footprint of a lightbar assembly 200 when it is held in place in this mounting bracket 10.

Modifications to embodiments of the present invention are possible without departing from the scope of the invention as defined by the accompanying claims. Expressions such as "including," "comprising," "incorporating," "consisting of," "have," "is," used to describe and claim the present invention are intended to be construed in a non-exclusive manner, namely allowing for items, components or elements not explicitly described herein also to be present. Reference to the singular is to be construed to relate to the plural, where applicable.

What is claimed is:

1. A modular lightbar system comprising:

a lightbar assembly comprising:

a housing having a first end, a second end, and a first face therebetween facing in a direction transverse to a longitudinal axis of the lightbar assembly;

a lens connected to the housing along the first face;

a first connector in the first end of the housing, opposite the lens, and having a first conductive part extending in a direction transverse to, and away from, the first face;

a second connector in the second end of the housing, opposite the lens, and having a second conductive part extending in a direction transverse to, and away from, the first face;

a light element electrically connected between the first conductive part and the second conductive part and disposed to emit light through the lens; and at least one control for controlling the light element; and a lightbar assembly connector having a major surface and a third connector having a third conductive part complementarily sized and shaped to releasably connect with one of the first conductive part and the second conductive part, the third conductive part extending in a direction transverse to the major surface such that the major surface is generally parallel to the first face with the third conductive part being releasably connected with one of the first conductive part and the second conductive part.

2. The modular lightbar system of claim 1, further comprising a second lightbar assembly comprising:

a secondary housing having a secondary first end and a secondary second end;

a secondary first connector in the secondary first end and having a secondary first conductive part extending in a direction transverse to a longitudinal axis of the second lightbar assembly;

a secondary second connector in the secondary second end and having a secondary second conductive part extending in a direction transverse to a longitudinal axis of the second lightbar assembly;

a secondary light element electrically connected between the secondary first conductive part and the secondary second conductive part; and a secondary lens connected to the secondary housing;

the lightbar assembly connector further comprising a fourth connector having a fourth conductive part complementarily sized and shaped to releasably connect with one of the secondary first conductive part and the secondary second conductive part of the second lightbar assembly, the fourth conductive part extending in a direction transverse to the major surface.

3. The modular lightbar system of claim 1, wherein the lightbar assembly connector comprises one of an angle connector, a straight connector, a T-connector, a variable angle connector, a joiner assembly, a distribution box, and a connection box.

4. The modular lightbar system of claim 2, wherein the lightbar assembly connector comprises one of an angle connector, a straight connector, a T-connector, a variable angle connector, a joiner assembly, a distribution box, and a connection box.

5. The modular lightbar system of claim 2, wherein the lightbar assembly connector comprises one of an angle connector, a variable angle connector, and a straight connector connectable between the lightbar assembly and the second lightbar assembly, wherein the longitudinal axis of the lightbar assembly is at a predetermined angle to the longitudinal axis of the second lightbar assembly when the lightbar assembly connector is connected therebetween.

6. The modular lightbar system of claim 5, wherein the predetermined angle ranges from 0° to 90°.

7. The modular lightbar system of claim 5, wherein the predetermined angle is one of 0° and 90°.

8. The modular lightbar system of claim 5, wherein the predetermined angle is one of fixed and variable.

9. The modular lightbar system of claim 1, wherein the lightbar assembly connector comprises a joiner assembly comprising a modular connector connectable to one of the first connector and the second connector, and a cable providing an electrical path one of from and to the one of the first connector and second connector.

10. The modular lightbar system of claim 2, wherein the lightbar assembly connector comprises a distribution box having the third connector and the fourth connector, the distribution box having a fifth connector and a switch for opening and closing an electrical path to the fifth connector.

11. The modular lightbar system of claim 1, wherein the lightbar assembly connector comprises a connection box connectable to one of the first connector and the second connector, and to a power source.

12. The modular lightbar system of claim 1, wherein the lightbar assembly further comprises a support to maintain the light element in a predetermined position within the housing.

13. The modular lightbar system of claim 12, wherein the support is in thermal contact with the light element.

14. The modular lightbar system of claim 13, wherein the support is in thermal contact with the housing.

15. The modular lightbar system of claim 1, wherein the first end and the second end of the lightbar assembly are separated from each other along a dimension of the lightbar assembly.

16. The modular lightbar system of claim 2, wherein the secondary first end and the secondary second end of the second lightbar assembly are separated from each other along a dimension of the second lightbar assembly.

17. The modular lightbar system of claim 1, wherein the lightbar assembly connector comprises one of a straight connector and an angle connector, each having a plug connector and a receptacle connector.

18. The modular lightbar system of claim 2, wherein the lightbar assembly connector comprises one of a straight connector and an angle connector, each having a plug connector and a receptacle connector.

19. The modular lightbar system of claim 1, further comprising a mounting bracket removably connectable with the lightbar assembly for securing the lightbar assembly to a surface.

20. The modular lightbar system of claim 19, wherein the mounting bracket further comprises a self-securing base.

21. The modular lightbar system of claim 19, wherein the mounting bracket further comprises a pivotable base.

22. The modular lightbar system of claim 1, wherein the lightbar assembly including a component configured for Bluetooth connectivity.

23. The modular system of claim 1, wherein the at least one control is for controlling one or more of: on/off, brightness, and color.

* * * * *